ial No. 269,888

United States Patent Office

2,744,148
Patented May 1, 1956

2,744,148

PROCESS FOR FLUORINATION OF HALOALKANES USING A HYDROGEN FLUORIDE ACTIVATED CATALYST CONTAINING ALUMINA, A METAL FLUORIDE AND BASIC ALUMINUM FLUORIDE

Robert P. Ruh and Ralph A. Davis, Midland, Mich., assignors to The Dow Chemical Company, Midland, Mich., a corporation of Delaware No Drawing. Application February 4, 1952,
Serial No. 269,888

15 Claims. (Cl. 260—653)

This invention relates to an improved fluorination catalyst and process, and, more particularly, to a method for fluorinating haloalkanes to highly fluorinated products, using an improved catalyst.

Heretofore, it has been known that some haloalkanes can be fluorinated by vapor phase reaction with hydrogen fluoride in the presence of metallic halides, a large number of which have been suggested as catalysts for the reaction. Daudt et al. in U. S. Patent No. 2,005,707 carry out the fluorination reaction with catalysts consisting of one or more metallic chlorides or bromides supported on a material which itself is "catalytically active as for example carbon" or on a "relatively inert material such as porous fused alumina" i. e. alpha alumina. Leicester states in U. S. Patent No. 2,110,369 that "a chromium fluoride catalyst may be prepared by treating freshly precipitated chromic hydroxide with aqueous hydrogen fluoride, pasting the product on granulated coke, and drying." More recently, Benning et al. in U. S. Patent No. 2,458,551 disclose a catalyst prepared by impregnating activated carbon with either ferric or chromic chloride and heating with hydrogen fluoride under essentially anhydrous conditions. This same patent describes a pelletized chromium fluoride catalyst. However, none of these patents or any known references disclose a catalytically active alumina either alone or in combination with one or more metals or metal halides as a catalyst for the fluorination of haloalkanes with hydrogen fluoride.

While the catalysts set forth in the above patents have been recommended generally for the vapor phase reaction of haloalkanes and hydrogen fluoride, they are effective mainly in inducing the formation of fluorinated products containing a low degree of fluoride substitution. When one attempts to use these catalysts in making highly fluorinated compounds, the conversions obtained are very poor unless extreme temperatures are employed. For example, the process of Daudt et al. forms only traces of products more fluorinated than $CF_2Cl_2$ by reacting $CCl_4$ and HF over $CuCl_2$ on activated carbon at temperatures up to 450° C. Leicester obtains only 8 per cent of $CF_3Cl$ at 550° C. when passing the same reactants over $CrF_3$ pasted on coke. Benning et al. require temperatures above 700° C. to obtain significant yields of $CF_4$ when reacting HF with $CCl_4$ or any other carbon tetrahalide in which at least one halogen atom is chlorine and the rest of the halogen atoms are fluorine. For example, they obtain only 0.4 per cent conversion to $CF_4$ when hydrogen fluoride and $CF_2Cl_2$ in a 3.9:1 mole ratio are passed over $CrF_3$ catalyst at 674° C.

The aforementioned catalysts are even less effective in the reaction of hydrogen fluoride with bromoalkanes than with chloroalkanes due to excessive decomposition during the fluorination of the former. For this reason, it has heretofore not been possible to produce highly fluorinated bromoalkanes such as bromotrifluoromethane by vapor phase reactions with hydrogen fluoride. It is only recently that $CF_3Br$ has been prepared at all, e. g. by Waterman in U. S. Patent No. 2,531,372 dated November 21, 1950. Waterman, however, prepared $CF_3Br$ by the low temperature direct fluorination of $CBr_4$ with antimony trifluoride and bromine and not by any reaction involving hydrogen fluoride.

It has now been discovered that alumina may be activated with hydrogen fluoride as hereinafter particularly described, and that the material so activated will catalyze the fluorination reaction of haloalkanes and hydrogen fluoride. Furthermore, fluorination catalysts much more active than any of those known in the literature are obtained when these activated materials are promoted with one or more of the metal halides of chromium, cobalt, nickel, copper and palladium. These very active promoted fluorination catalysts are more effective in directing the course of the fluorination to greater conversions and yields of more highly fluorinated products than has heretofore been achieved. For example, $CCl_4$ is easily fluorinated to $CF_3Cl$ and $CF_4$ at 350° C. over the catalysts of the invention. It has also been discovered that bromoalkanes react readily with hydrogen fluoride over these new catalysts to produce highly fluorinated bromoalkanes, i. e. $CBr_4$ is fluorinated to $CF_3Br$.

The haloalkanes which may be fluorinated in accordance with the invention are partially or completely halogenated saturated hydrocarbons containing no more than two carbon atoms, no iodine, and at least one halogen other than fluorine. More specifically, these saturated haloalkanes have from one to two carbon atoms including at least one carbon atom attached to a minimum of two halogens of atomic number not greater than 35, i. e., fluorine, chlorine, or bromine, at least one of which is of atomic number from 17 to 35 inclusive, i. e., chlorine or bromine.

According to the most preferred embodiment of the invention, the haloalkane has from one to two carbon atoms and from three to four chlorine or bromine atoms all of which are attached to a single carbon atom, i. e., the haloalkane is carbon tetrachloride, chloroform, or 1,1,1-trichloroethane or the bromine analogs thereof. Other haloalkanes which may be fluorinated by the process of the invention are methylene chloride, pentachloroethane, hexachloroethane, dichlorofluoromethane, dichlorodifluoromethane, trichlorofluoromethane, methylene bromide, acetylene tetrabromide, dibromodifluoromethane, tribromofluoromethane, tribromochloromethane, bromochlorodifluoromethane, etc. Fluorination according to the invention proceeds with minimum formation of by-products for those haloalkanes having a normal boiling point below 200° C. and thermally stable per se up to 200° C.

The new and improved catalysts of the invention may be prepared by impregnating a porous alumina in water or a dilute hydrohalic acid and activating the wet alumina in a stream of anhydrous hydrogen fluoride. The process of activating alumina which renders it catalytic for the vapor phase reaction of hydrogen fluoride with haloalkanes at least partially converts alumina to basic aluminum fluorides. It is desirable to promote the alumina either before or after activation with one or more halides of chromium, cobalt, nickel, copper, or palladium as hereinafter described.

Almost any porous alumina is suitable for preparing the catalysts of the invention. Any of the porous crystalline aluminas reported by Stumpf et al. in Industrial and Engineering Chemistry, vol. 42, pages 1398–1403 (1950), such as chi alumina, gamma alumina, kappa alumina, alpha alumina, etc., are suitable. Activated aluminas prepared by the controlled calcination of alumina hydrates are very satisfactory for the preparation of catalysts. In fact, active catalysts have been prepared from products containing approximately equal amounts of alumina and alumina hydrates. Highly desirable aluminas which are commercially available are the activated aluminas prepared by the calcination of a rock-like alumina trihydrate derived from bauxite. The original granules do not shrink appreciably during this calcination, and the loss of water with the accompanying recrystallization creates a large surface area. These particulated aluminas are readily impregnated in solutions of metal halides without change in physical shape or loss of structural rigidity. The essentially non-porous native or artificially fused or fired aluminum oxides such as corundum, commonly used for grinding and polishing, are not suitable for the improved catalysts of the invention.

Impurities in aluminas may or may not be deleterious depending on the nature of the contaminant. Silica is undesirable since it forms gaseous $SiF_4$ with hydrogen fluoride. Impurities such as MgO, CaO, and $Na_2O$ form inert, solid fluorides. Common heavy metal contaminants such as iron are usually not present in proportions sufficient to affect the catalysis.

According to the invention, alumina is rendered catalytically active for fluorination reactions by treatment to convert at least part thereof to basic aluminum fluorides whose compositions fall inside the limits $AlF_3$ and $Al(OH)_3$. The crystalline hydroxyfluorides falling within the range of composition $AlF(OH)_2$ to $AlF_2(OH)$, commonly written $Al(OH,F)_3$, and described in detail by Cowley et al. in the Journal of the American Chemical Society, vol. 70, pages 105 to 109 (1948) together with other compounds believed to be aluminum hydroxy- (or oxy) fluorides, are present in significant proportions in the catalytically activated aluminas of the invention. These latter compounds are related to the $Al(OH,F)_3$ compounds but are as yet unidentified except by their X-ray diffraction patterns. It is the presence of one or more of these basic aluminum fluorides which is believed to account for catalytic activity, since it has been found experimentally that neither alumina, aluminum fluoride, nor the crystalline hydrates of either exhibits any catalytic effect. In general, best results are obtained when at least a major part of the alumina is converted to basic aluminum fluorides, although with lesser proportions, some catalytic effect is still observed.

In converting alumina to basic fluorides, the alumina is impregnated in water or a dilute hydrohalic acid and the wet alumina so impregnated is then dried with anhydrous hydrogen fluoride. For example, gamma alumina impregnated in 6 normal hydrochloric acid and then dried in a stream of anhydrous hydrogen fluoride gave a catalyst consisting essentially of basic aluminum fluorides. However, no catalysis and no basic aluminum fluorides have been observed when porous alumina such as gamma alumina and gamma alumina monohydrate (boehmite) were treated with anhydrous hydrogen fluoride without previously being impregnated with water or hydrohalic acid.

In addition to at least 5 per cent by weight of the hereinbefore described basic aluminum fluorides, the catalysts of the invention contain at least one member of the group consisting of alumina, alumina hydrate, and aluminum fluoride. Although these catalytically activated aluminas are sometimes initially extremely active per se, it has been observed that when they are promoted with one or more metal halides of the group consisting of chromium, cobalt, nickel, copper, and palladium, carbon coatings which adversely affect activity do not tend to build up as rapidly on their surfaces. These promoted catalysts have been found to contain, in addition to basic aluminum fluorides, chemical compounds thought to be metal-aluminum-fluorides which have not been observed in other fluorination catalysts. The promoted catalysts of the invention are usually prepared by impregnating alumina in a solution of a metal halide and drying the wet impregnated alumina in an atmosphere of hydrogen fluoride. The highly active catalysts of the invention are not obtained when the impregnated alumina is first dried and then anhydrous hydrogen fluoride passed over the dry material.

In a preferred procedure, the promoted alumina catalysts are usually prepared by soaking porous alumina in a strong metal chloride solution prepared by dissolving a chloride of chromium, cobalt, nickel, copper or palladium in water or hydrochloric acid. Solutions of any of the halides or the five aforesaid heavy metals may be used to impregnate alumina, although as a general practice, the chlorides are used. When, however, fluorides are employed, hydrofluoric acid is used to prepare a solution thereof. The impregnation procedure is controlled so that the alumina absorbs an effective proportion of the metal halide solution. Usually a sufficient amount of a metal halide is incorporated in the alumina so that the final promoter content of the catalyst, as expressed in terms of the promoter metal, is from 0.1 to 10 per cent by weight. In practice, solutions containing approximately 2 moles of metal halide per liter of solvent are commonly used to impregnate alumina.

When the alumina has become saturated with the metal chloride solution, the wet impregnated material is treated to form an aluminum basic fluoride therein. To this end, the impregnate involved is given a preliminary treatment by passing a stream of anhydrous hydrogen fluoride over it in a suitable vessel until sensibly dry. A polytetrafluoroethylene vessel is a suitable container for the activation of small quantities of catalyst. Larger amounts of catalysts may be more conveniently activated in a rotating drum with a polytetrafluoroethylene liner. Although no heat is applied during this initial conversion, heat is given off by reaction with hydrogen fluoride and the material gradually becomes sensibly dry. A further conversion and activation may then be carried out most conveniently in the same reaction vessel in which the organic fluorination is to be conducted. Anhydrous hydrogen fluoride is passed over the material dried according to the preceding description while the reaction vessel is slowly heated to a temperature approximating the intended reaction temperature for the organic fluorination in which the catalyst is to be used. Passage of hydrogen fluoride is preferably continued until water is no longer given off and the initial rapid interaction with the alumina substantially ceases.

In carrying out the fluorination of haloalkanes according to the invention using the new catalysts hereinbefore characterized, the haloalkane is vaporized and passed together with hydrogen fluoride through a bed of the catalyst at an elevated temperature.

The process is satisfactorily carried out when the temperature of the catalyst bed is from 200° to 425° C. with a more restricted range from 225° to 375° C. preferred. Temperatures from 150° to 500° C. may be considered for all practical purposes as the operative limits of the fluorination reaction. The fluorination temperature is dependent on a number of variables such as identity of the haloalkane, catalyst composition, contact time, product desired, etc. When bromoalkanes are fluorinated, slightly lower temperatures are employed than with chloroalkanes for the same degree of fluorination. In general, the optimum temperature varies inversely as contact time and directly with the degree of fluorination. That is to say, the temperature may be reduced slightly as contact time is increased; conversely, the higher the desired degree of fluorination of a given compound, the higher the temperature required. For instance, higher temperatures are required to convert $CBr_4$ to $CBrF_3$ than to $CBr_2F_2$ as will be apparent in the examples. Temperatures also vary with the composition and activity of the fluorination catalyst. For example, a nickel halide-alumina catalyst activated according to the invention will apparently operate at lower temperatures to give higher conversions of the fluorinated product desired than a similarly prepared copper halide-alumina catalyst. The optimum temperature also varies with the activity of the catalyst which in turn is dependent on other variables, such as the age of the catalyst and possible surface coatings, e. g. carbon, due to prolonged use. The optimum operating conditions for any given fluorination within the ranges discussed can easily be determined by trial.

The ratio of hydrogen fluoride to haloalkane employed in the fluorination reaction may be varied within wide limits depending on the end product desired. In general, however, at least one mole of hydrogen fluoride should be used per mole of haloalkane. The preferred ratio, for making a maximum of any specific fluorinated compound, is from one to two times the proportion stoichiometrically required for producing that compound. For instance, in converting carbon tetrachloride to chlorotrifluoromethane, there should be at least about 3.0 moles of hydrogen fluoride per mole of carbon tetrachloride.

Contact times up to 27 seconds have been used in the fluorination of $CCl_4$ to $CClF_3$ although in general such a long time of contact is not to be desired if for no other reason than low throughput. Contact times from 1 to 20 or more seconds may be used in the process, although 1 to 10 seconds are usually preferred. Too short a contact time results in insufficient conversion and necessitates recycling.

The fluorination reaction is ordinarily carried out at pressures slightly above atmospheric although both subatmospheric and superatmospheric pressures are operable. Aside from greater capacity per unit volume of catalyst, higher pressures are sometimes preferred to give more highly fluorinated compounds. In general, pressures from 10 to 200 pounds per square inch gauge are employed.

In some instances it has been found advantageous to carry out the vapor phase fluorination in two or more stages, for example, using a first stage wherein fluorination is conducted at a temperature of about 200° C. and a second stage wherein fluorination is conducted at a temperature of 300 to 350° C. If desired, subsequent stages with higher temperatures may be employed.

A deposit of carbon is slowly built up on the catalysts of the invention when they are used for long periods of time at preferred reaction conditions. The rate of carbon deposition is affected by several factors such as the identity of the haloalkane feed and the temperature. Accordingly, the rate of carbon formation is more rapid during the fluorination of carbon tetrabromide than carbon tetrachloride. Furthermore, catalyst beds operated at higher than optimum temperatures build up a carbon coating which increases rapidly with rising temperature.

These carbon-containing catalysts of lowered activity may be regenerated by passing a stream of air or oxygen-containing gas preheated to approximately 300° C. over the catalyst at a bed temperature of about 400° C. until carbon dioxide is no longer detected in the vent gas. A stream of anhydrous hydrogen fluoride may then be passed over the catalyst maintained at a bed temperature of approximately 400° C. to saturate the catalyst with HF prior to another fluorination run.

The gaseous products of the reaction of haloalkane and hydrogen fluoride catalyzed according to the invention may be separated into their component products according to their compositions and concentrations by known procedures, e. g. by a series of fractional condensations and distillations, water and aqueous sodium hydroxide washes, and drying steps.

When the product gases contain hydrogen bromide, as in the fluorination of $CBr_4$, the HBr may advantageously be recovered by a treatment in which it is reacted with $CCl_4$ to form additional $CBr_4$ feedstock. To this end, the product gases are cooled to condense the higher boiling compounds such as HF, $CBr_3F_2$ and $CBr_3F$, e. g. to about −10° to −20° C. The HBr is then separated from the uncondensed gases consisting essentially of $CBrF_3$ and HBr by passing these gases through $CCl_4$ catalyzed with aluminum halide to convert $CCl_4$ to $CBr_4$ as described in U. S. Patent 2,553,518.

EXAMPLE 1

An improved fluorination catalyst of the invention was produced according to the following procedure:

An 8–14 mesh activated alumina (Alcoa F-10) produced by the calcination of alumina trihydrate made from bauxite and found by X-ray diffraction analysis to consist preponderantly of gamma alumina with some chi alumina was dried at 250° C. for four hours. A solution of 4754 grams (20 moles) of C. P. $NiCl_2 \cdot 6H_2O$ in 10 liters of 6 normal hydrochloric acid was used to impregnate 16 liters of the dry alumina described above. After standing overnight, the excess solution was removed by filtration. The wet impregnated alumina was transferred to a rotating nickel drum and treated with anhydrous hydrogen fluoride until it became sensibly dry. During this addition, the impregnated alumina became hot and water was evolved. The addition of hydrogen fluoride was continued for several hours and the drum was mildly heated externally until no water was found in the exit gas and the color changed from light green to tan. After the catalyst was screened through 8–14 mesh sieves, it was packed in a nickel reaction tube and heated to 350° C. in a stream of anhydrous hydrogen fluoride for five hours. This catalyst, after rescreening, was ready for use. It contained a considerable proportion of crystalline basic aluminum fluoride and approximately 5 per cent Ni by weight.

EXAMPLE 2

This example describes a new, continuous, vapor phase process for the manufacture of $CBrF_3$ by the reaction of HF with $CBr_4$ over the activated nickel halide-alumina catalyst made in Example 1. The regeneration of this catalyst after prolonged use is also described.

A vertical nickel reaction tube three inches inside diameter and seven feet long was packed to a height of six feet with the fluorination catalyst of Example 1. The reactor was heated externally at a temperature averaging 290° to 310° C. as measured on the outside of the tube at the center of the catalyst bed. A vapor phase mixture of $CBr_4$ with anhydrous hydrogen fluoride, the former at a rate of 10.8 pounds per hour and the latter at a rate of 4.7 pounds per hour, was passed through the reactor for 72 hours. The total $CBr_4$ charged amounted to 778 pounds; the total amount of HF charged was 339.8 pounds.

The gaseous reaction products were cooled somewhat and passed into the still pot of a nickel still maintained at 10° to 20° C., surmounted by a dephlegmating column the top of which was cooled to maintain an exit gas temperature of −50° to −56° C. In this system, the $CBrF_3$ and HBr components of the reaction product were continuously removed overhead, while a mixture of $CBr_2F_2$, $CBr_3F$, $CHBr_2F$, and $CHBr_3$ byproducts, some $Br_2$, and unreacted $CBr_4$ and HF was withdrawn from the still pot as a liquid. This entire mixture, the organic part of which represented less than 10 mole per cent of the total $CBr_4$ fed, was subsequently separated into its components by scrubbing with aqueous sodium hydroxide, then drying and rectifying the remainder.

The dephlegmator overhead was scrubbed with aqueous sodium hydroxide solution and with water to remove HBr and then dried over anhydrous $CaSO_4$. The total organic product recovered from the dephlegmator overhead and the still pot amounted to 92.5 mole per cent of the $CBr_4$ charged. From the overhead there was obtained 291 pounds of $CBrF_3$ which represents a conversion of 83.3 mole per cent. The data for the run are listed in the table at the end of this example.

The fluorination of $CBr_4$ to $CBrF_3$ was continued until the total throughput amounted to 2334 pounds of $CBr_4$ and 835 pounds of anhydrous hydrogen fluoride. During this run, the temperature of the reaction tube was slowly raised from 290° to 355° C. in an attempt to compensate for decrease in activity of the catalyst. At the end of 179.5 hours, the fluorination process was stopped and carbon deposited on the catalyst was burned off by passing air, preheated to 290° C., through the reactor, held at 375° to 460° C., for eight hours. Hydrogen fluoride was then passed through the tube for fifteen minutes to saturate the catalyst before starting the next run.

Another run on the fluorination of $CBr_4$ over this regenerated catalyst was carried out at 350° to 390° C. Considerable bromine in the vent indicated that this reaction temperature was too high causing excessive decomposition and carbonization. Consequently, the mole per cent recovery of $CBrF_3$ based on $CBr_4$ charged was lower than that of the initial run. The table contains the data for the run over the regenerated catalyst.

The catalyst was again burned off using the regeneration conditions outlined above and another run was made at the lower temperature of 300° to 340° C. to minimize decomposition. A conversion of 75.3 mole per cent to $CBrF_3$ was obtained. The following table also lists the data for the fluorination run after the second regeneration of the catalyst.

|  | Fresh Catalyst | First Regeneration | Second Regeneration |
|---|---|---|---|
| Temperature of reactor_____° C__ | 290-310 | 350-390 | 300-340 |
| $CBr_4$ feed_____pounds__ | 778 | 833 | 887 |
| HF feed_____do____ | 339.8 | 271.5 | 289 |
| Mole ratio, HF/$CBr_4$_____ | 7.2 | 5.4 | 5.4 |
| Duration of run_____hours__ | 72 | 69 | 83.5 |
| $CBrF_3$ recovered_____pounds__ | 291 | 241.5 | 300 |
| Recovery $CBrF_3$ based on $CBr_4$ charged_____mole percent__ | 83.3 | 64.1 | 75.3 |

EXAMPLE 3

The continuous vapor phase fluorination of $CBr_4$ to $CBr_2F_2$ with hydrogen fluoride over an activated nickel halide-alumina catalyst prepared as in Example 1 is hereinafter described (A). An experiment in which $CBr_4$ was heated with hydrogen fluoride over a catalyst not prepared in accord with the invention is also described (B).

A

A nickel reaction tube three inches inside diameter and seven feet long was packed to a height of six feet with a catalyst prepared according to the procedure of Example 1. The reactor was externally heated at a temperature averaging 230° to 250° C. and a vapor phase mixture of $CBr_4$ and HF was passed over the catalyst for 74 hours. The total $CBr_4$ charged amounted to 1722 pounds; the total HF charged was 420 pounds.

The reaction products were scrubbed in dilute sodium hydroxide solution, collected in traps cooled with solid carbon dioxide, and fractionally distilled. The total organic product recovered amounted to 90.2 mole per cent of the $CBr_4$ charged. The following table contains the data for the reaction.

Temperature of reactor_ 230° to 250° C.
$CBr_4$ feed_____ 1722 pounds (5.2 pound moles)
HF feed_____ 420 pounds (21.0 pound moles)
Mole ratio HF/$CBr_4$____ 4.0
Contact time_____ 4.6 seconds
Duration of run_____ 74 hours
Product recovery (based 988 pounds (90.2 mole per cent)
  on $CBr_4$ charged).
  $CBrF_3$_____ 141 pounds (18.2 mole per cent)
  $CBr_2F_2$_____ 617.2 pounds (56.3 moles per cent)
  $CHBr_2F$_____ 3.5 pounds (0.4 mole per cent)
  $CBr_3F$_____ 155.3 pounds (10.9 mole per cent)
  $CHBr_3$_____ 17.2 pounds (1.3 mole per cent)
  $CBr_4$_____ 53.8 pounds (3.1 mole per cent)

The fluorination of $CBr_4$ was continued until 1600 pounds of $CBr_2F_2$ had been prepared before the catalyst was regenerated according to the procedure described in Example 2. X-ray diffraction analysis of the catalyst before and after regeneration showed basic aluminum fluorides to be present in the catalyst in approximately the same proportions in each.

B

A vapor phase mixture of $CBr_4$ and HF was passed over a catalyst not in accord with the invention prepared from the same alumina as in Example 1 impregnated in a nickel chloride solution of the same concentration in a manner similar to the procedure of Example 1. The impregnated alumina was dried at 350° C. and anhydrous hydrogen fluoride was then passed over the dry material, instead of over the wet impregnated material as in Example 1.

A vapor mixture of HF and $CBr_4$ in a mole ratio of 4.8:1 was passed over a bed of the above described catalyst heated in the temperature range of 300° to 500° C. Substantial decomposition of the $CBr_4$ took place. What $CBr_4$ did undergo fluorination was converted preponderantly to $CBr_3F$, with but little if any higher fluorinated products being formed.

A catalyst prepared in a similar manner to the catalyst used in this last run was found by X-ray diffraction analysis to contain approximately equal amounts of anhydrous aluminum fluoride and gamma alumina, and no basic aluminum fluoride.

EXAMPLE 4

This example describes a new, continuous, vapor phase process for the manufacture of $CH_2F_2$ whereby $CH_2Br_2$ is fluorinated with HF over a catalyst of the invention. This example also demonstrates that the catalysts of the invention may be prepared from aluminas impregnated in a hydrofluoric acid solution of the metallic fluoride.

A solution of 87.6 grams of anhydrous nickel fluoride in 453 ml. of 24 normal hydrofluoric acid was used to impregnate 725 ml. of Alcoa F-10 activated alumina previously dried at 250° C. for four hours. The wet impregnated alumina was then activated with anhydrous hydrogen fluoride according to the procedure of Example 1. It contained a substantial proportion of crystalline basic aluminum fluoride.

A vertical nickel reaction tube three quarters of an inch inside diameter and 30 inches in length was packed to a height of 24 inches with the above described catalyst. The reactor was heated to 400° C. as measured externally at a point near the middle of the catalyst bed and a vapor phase mixture of HF and $CH_2Br_2$ was passed over the catalyst for 220 minutes. The reaction product collected during the last 160 minutes was scrubbed in dilute sodium hydroxide solution, collected in traps cooled in solid carbon dioxide, and fractionally distilled. The following table contains the data for the reaction.

Temperature of reactor _____° C__ 400
Mole ratio HF/$CH_2Br_2$ _____ 4.0
Contact time _____seconds__ 4.8
Product recovery (based on $CH_2Br_2$ charged)
  mole per cent__ 81.4
  $CH_2F_2$ _____do____ 28.4
  $CH_2BrF$ _____do____ 15.2
  $CH_2Br_2$ _____do____ 37.8

EXAMPLE 5

This example describes a new, continuous, vapor phase process for the manufacture of $CH_2F_2$ whereby $CH_2Cl_2$ is fluorinated with HF over an activated nickel halide-alumina catalyst of the invention.

A catalyst prepared according to the procedure of Example 1 was packed into a nickel reaction tube as described in Example 4. The reactor was heated to 450° C. and a vapor phase mixture of $CH_2Cl_2$ and HF was passed over the catalyst for 2 hours. The reaction product collected during the second hour was scrubbed, collected, and distilled as described in the preceding example. The following table lists the data for the reaction.

| | |
|---|---|
| Temperature of reactor ° C | 450 to 460 |
| Mole ratio HF/$CH_2Cl_2$ | 4.83 |
| Contact time seconds | 1.9 |
| Product recovery (based on $CH_2Cl_2$ charged) mole per cent | 76.7 |
| $CH_2F_2$ do | 19.5 |
| $CH_2ClF$ do | 14.9 |
| $CH_2Cl_2$ do | 34.1 |
| Fraction boiling at −83° C. do | 8.2 |

EXAMPLE 6

A continuous vapor phase process for the reaction of HF with $CHCl_3$ to form $CHF_3$ over an activated copper halide-alumina catalyst of the invention is hereinafter described.

The F-10 alumina described in Example 1 was impregnated in a solution of 13.2 grams of $CuF_2$ in 250 ml. of 2 normal hydrofluoric acid. Approximately 125 ml. of this solution was retained by the alumina. A stream of anhydrous hydrogen fluoride was passed over the wet impregnated alumina until it become sensibly dry. Basic aluminum fluorides were present in the catalyst.

The reactor described in Example 4 packed with the above described catalyst was heated to 350° C. and a vapor phase mixture of $CHCl_3$ and HF was passed over the catalyst at 400° C. for 3 hours. The reaction product of the last two hours was treated as in the preceding example. Data are tabulated below.

| | |
|---|---|
| Temperature of reactor ° C | 400 |
| Mole ratio HF/$CHCl_3$ | 8.9 |
| Contact time seconds | 2.9 |
| Product recovery (based on $CHCl_3$ charged) mole per cent | 94.5 |
| $CHF_3$ do | 90.0 |
| $CHClF_2$ do | 3.0 |
| $CHCl_2F$ do | 0.7 |
| $CHCl_3$ do | 0.8 |

EXAMPLE 7

The fluorination of 1,1,1-trichloroethane over the activated nickel halide-alumina catalyst of Example 1 is hereinafter described.

Two vertical nickel reactors three quarters of an inch inside diameter by 30 inches in length were each packed to a depth of 24 inches with a catalyst prepared as described in Example 1. These reactors in series were heated to 350° C. and a vapor phase mixture of 1,1,1-trichloroethane and hydrogen fluoride was passed through the catalyst bed. The reaction products were treated as previously described and fractionally distilled. The following table contains the data for the reaction.

| | |
|---|---|
| Temperature of reactor ° C | 350 |
| Mole ratio of HF/$CCl_3CH_3$ | 3.4 |
| Contact time seconds | 8.9 |
| Duration of run minutes | 60 |
| Product recovery (based on $CCl_3CH_3$ charged) mole per cent | 94.2 |
| $CH_3CF_3$ do | 77.2 |
| $CH_3CClF_2$ do | 13.4 |
| $CH_2=CClF$ do | 3.6 |

EXAMPLE 8

The fluorination of $CCl_3CCl_3$ over an activated nickel halide-alumina catalyst of the invention is hereinafter described.

The catalyst was prepared according to the procedure of Example 1 except that a very dilute solution of nickel chloride was used to impregnate the F-10 alumina. Quantitative spectrographic analysis reported the presence of 0.28 per cent by weight Ni in the catalyst. A nickel reaction tube as described in Example 4 was loaded with this catalyst and heated to 400° C. A vapor phase mixture of $CCl_3CCl_3$ and HF was then passed through the reactor for five hours. The following table lists the data for the last two hours of the reaction.

| | |
|---|---|
| Temperature of reactor ° C | 400 |
| Mole ratio HF/$CCl_3CCl_3$ | 29 |
| Contact time seconds | 3.8 |
| Product recovery (based on $CCl_3CCl_3$ charged) mole per cent | 84.6 |
| Low boiler do | 5.6 |
| $CF_3CClF_2$ do | 2.0 |
| $CClF_2CClF_2$ do | 44.0 |
| $CCl_2CCl_2F$ do | 31.7 |
| $CCl_2FCCl_2F$ do | 1.3 |

EXAMPLE 9

The ability of porous aluminas activated in accord with the invention and containing relatively large proportions of basic aluminum fluorides to catalyze the fluorination of $CCl_4$ is described (C). Since porous alumina itself is not catalytic, and aluminum fluoride is hereinafter shown to be non catalytic (D), it is clear that the basic aluminum fluorides are the active catalyst.

C

An 8–14 mesh Alcoa F-10 activated alumina produced by the controlled calcination of alumina trihydrate made from bauxite was found by X-ray diffraction analysis to consist preponderantly of gamma alumina with some chi alumina. An indication of impurities in the activated alumina F series is given by the following analysis: 2% loss on ignition, 0.1% $Na_2O$, 0.1% $SiO_2$, 0.5% $Fe_2O_3$, and 0.7% Cl. Approximately 300 ml. of this F-10 alumina, were allowed to soak up 148 ml. of distilled water in a polyethylene bottle. The wet alumina was dried in an atmosphere of hydrogen fluoride on a polytetrafluoroethylene sheet, final drying being effected at 200° C.

The nickel reactor described in Example 4 was loaded with the alumina catalyst prepared according to the preceding description, heated to 350° C., and a vapor phase mixture of $CCl_4$ and HF was passed through it for 200 minutes. The data for the last 80 minutes of the run are contained in the table.

X-ray diffraction analysis showed that the major crystalline constituents of the catalyst after the fluorination run were (in addition to gamma alumina) anhydrous $AlF_3$, anhydrous $Al(OH,F)_3$, and another probable basic aluminum fluoride, the three substances being in the ratio of 4:4:2. By quantitative spectrographic analysis, the concentration of nickel in the catalyst after the fluorination of $CCl_4$ was shown to be less than 0.001 per cent by weight. Superficial examination showed the surface of the catalyst to be coated with carbon.

| | |
|---|---|
| Temperature of reactor ° C | 350 |
| Mole ratio HF/$CCl_4$ | 4.05 |
| Contact time seconds | 3.4 |
| Product recovery (based on $CCl_4$ charged) mole per cent | 92.7 |
| $CF_4$ do | 0.2 |
| $CClF_3$ do | 76.8 |
| $CCl_2F_2$ do | 15.7 |

D

The aluminum fluoride tested for catalytic activity was prepared by stirring 200 ml. of 6 mesh activated alumina with a water slurry of 200 grams of reagent grade aluminum fluoride. The aluminum fluoride coated alumina was packed in the same reactor used in the preceding run and heated to 400° C. with nitrogen passing over the bed for 2 hours followed by anhydrous hydrogen fluoride for 15 minutes.

A vapor phase mixture of $CBr_4$ and HF was passed at 360° C. through the reactor for approximately 30 minutes. Extensive decomposition occurred and no fluorination products could be isolated.

EXAMPLE 10

This example illustrates the effectiveness with which $CCl_4$ is fluorinated over an alumina activated according to the invention and promoted with a very small amount of a nickel halide (E). In addition, two experiments illustrate heating $CCl_4$ with HF over catalysts not according to the invention, such as a pelleted $NiCl_2$ catalyst (F) and an activated carbon impregnated with $NiCl_2$ (G).

E

A nickel halide-alumina catalyst was prepared according to the procedure of Example 1 except a very dilute solution of nickel chloride was used to impregnate the F-10 alumina.

The nickel reactor used in the preceding example was packed with the above described catalyst and heated to 350° C. A vapor phase mixture of $CCl_4$ and HF was reacted over the catalyst; the reaction products were treated and fractionally distilled as hereinbefore described. Data for the last 90 minutes of the run are contained in the accompanying table.

X-ray diffraction analysis of the major crystalline constituents of the catalyst, in addition to gamma alumina, showed anhydrous $AlF_3$ and anhydrous $Al(OH,F)_3$ to be present in about equal concentrations. Another crystalline constituent present in lesser amounts was reported as a possible aluminum-nickel-fluoride compound. Quantitative spectrographic analysis reported the presence of 0.28 per cent by weight Ni in the catalyst.

F

The same reactor used in the preceding runs was packed with a catalyst not in accord with the invention of 6–14 mesh $NiCl_2$ pellets, dried with anhydrous hydrogen chloride for 4 hours at 350° C., and a vapor phase mixture of $CCl_4$ and HF was then passed over the catalyst for 185 minutes. Reaction data for the last 65 minutes of the run appear in the following table.

G

A solution of 119 grams of $NiCl_2 \cdot 6H_2O$ in 250 ml. of 24 normal hydrofluoric acid was used to impregnate 300 ml. of activated walnut charcoal. The wet impregnated charcoal was then dried in an atmosphere of anhydrous hydrogen fluoride. This catalyst, not in accord with the invention, was used to fluorinate $CCl_4$ for 4.5 hours. The data for the last 1.5 hours of run are listed in the table.

|  | E | F | G |
| --- | --- | --- | --- |
| Temperature of reactor ° C | 350 | 350 | 350 |
| Mole ratio, $HF/CCl_4$ | 5.3 | 3.6 | 5.1 |
| Contact time seconds | 4.1 | 4.6 | 4.9 |
| Product recovery (based on $CCl_4$ charged) mole percent | 93.9 | 91.0 | 90.9 |
| $CF_4$ do | 0.6 | | |
| $CClF_3$ do | 89.4 | | 1.3 |
| $CCl_2F_2$ do | 3.9 | 5.0 | 24.0 |
| $CCl_3F$ do | | 66.1 | 57.0 |
| $CCl_4$ do | | 20.0 | 8.6 |

EXAMPLE 11

Carbon tetrachloride was fluorinated to $CClF_3$ and $CF_4$ over an activated nickel halide-alumina catalyst of the invention.

Two vertical nickel reaction tubes as described in Example 4 were packed with a catalyst prepared according to the procedure of Example 1. These reactors, placed in series, were heated to 350° C. and a vapor phase mixture of $CCl_4$ and HF was passed through them for 100 minutes. The following table contains the data for the reaction.

| | |
| --- | --- |
| Temperature of catalyst ° C | 350 |
| Mole ratio $HF/CCl_4$ | 3.75 |
| Contact time seconds | 27 |
| Product recovery (based on $CCl_4$ charged) mole per cent | 72.6 |
| $CF_4$ do | 14.9 |
| $CClF_3$ do | 53.5 |
| $CCl_2F_2$ do | 4.2 |

EXAMPLE 12

This example describes the fluorination of $CBr_2F_2$ over an activated nickel halide-alumina catalyst of the invention prepared from nickel bromide.

The two reactors used in the preceding example were packed with a catalyst prepared as in Example 1 except, that the solution used to impregnate the alumina contained nickel bromide instead of nickel chloride. Upon placing these reactors in series, the first reactor was heated to 350° C. and the second to 500° C. A vapor phase mixture of $CBr_2F_2$ and HF was then passed over the catalyst for a period of 60 minutes. The reaction data is recorded in the table.

| | |
| --- | --- |
| Temperature of catalyst ° C | 350 to 500 |
| Mole ratio $HF/CBr_2F_2$ | 1.6 |
| Contact time seconds | 11 |
| Product recovery (based on $CBr_2F_2$ charged) mole per cent | 90.0 |
| $CHF_3$ do | 1.4 |
| $CBrF_3$ do | 86.2 |
| $CHBrF_2$ do | 1.7 |
| $CBr_2F_2$ do | 0.7 |

EXAMPLE 13

The following example describes how the catalysts of the invention may also be prepared by impregnating alumina in solutions of metallic fluorides dissolved in hydrofluoric acid instead of in water.

A solution of 87.6 grams of $NiF_2$ dissolved in 453 ml. of 24 normal hydrofluoric acid was used to impregnate 725 ml. of Alcoa F-10 alumina. Anhydrous hydrogen fluoride was then passed over the wet impregnated alumina in a nickel vessel until dry. A nickel reactor described in Example 4 was packed with the catalyst so prepared and heated to about 350° C. A vapor phase mixture of $CBr_4$ and HF was passed over the catalyst for 180 minutes. The data for the last 120 minutes of the reaction are listed in the table.

| | |
| --- | --- |
| Temperature of reactor ° C | 355 |
| Mole ratio $HF/CBr_4$ | 7.5 |
| Contact time seconds | 6.8 |
| Product recovery (based on $CBr_4$ charged) mole per cent | 88.3 |
| $CF_4$ do | 2.1 |
| $CBrF_3$ do | 78.1 |
| $CBr_2F_2$ do | 0.6 |

EXAMPLE 14

This example describes the fluorination of $CBr_4$ over each of two catalysts, prepared by impregnating nickel chloride on alpha alumina (H) and on an alumina consisting of gamma alumina and gamma alumina monohydrate (I), and, in each case thereafter activating in accord with the invention.

H

A sample of the alumina described in Example 1 was placed in an electric furnace and heated to 1250° C. for 4.5 hours. After this treatment the alumina was found by X-ray diffraction analysis to be 100 per cent alpha alumina. This alpha alumina was then immersed in a nickelous chloride-hydrochloric acid solution and then while still wet treated with HF according to the procedure of Example 1. A nickel reactor described in Example 4 was packed with this catalyst and heated to 350° C. A vapor phase mixture of $CBr_4$ and HF was passed through the reactor over a period of 90 minutes. The data are listed in the accompanying table.

I

A commercially activated alumina (Alcoa F–1) analyzed by X-ray diffraction analysis was found to contain about equal amounts of gamma alumina and gamma alumina monohydrate (boehmite). It was impregnated in a nickel chloride solution and activated with HF according to the procedure of Example 1. This catalyst was loaded into two nickel reaction tubes placed in series according to Example 11 and heated to 350° C. A vapor phase mixture of $CBr_4$ and HF was passed over the catalyst for 90 minutes. The data for the last 30 minutes of the reaction are recorded in the following table.

|  | H | I |
|---|---|---|
| Temperature of catalyst _____° C__ | 350 | 350 |
| Mole ratio, $HF/CB_4$ _____ | 6.3 | 7.1 |
| Contact time _____seconds__ | 5.7 | 3.0 |
| Product recovery (based on $CBr_4$ charged) mole percent__ | 100 | 74.4 |
| $CF_4$ _____do____ | 0.3 | 0.2 |
| $CBrF_3$ _____do____ | 88.6 | 66.0 |
| $CHF_3$ _____do____ | 10.1 | 4.9 |
| $CBr_2F_2$ _____do____ | 1.0 | 1.8 |
| $CHBr_2F$ _____do____ |  | 0.3 |
| $CBr_3F$ _____do____ | 0.7 | 1.2 |

EXAMPLE 15

This example describes the fluorination of $CCl_4$ over basic aluminum fluoride-containing catalysts of the invention promoted with the halides of chromium (J), cobalt (K), and palladium (L).

J

A solution of 52 grams of $Cr(OH)_3$ dissolved in 250 ml. of 24 normal hydrofluoric acid was used to impregnate 300 ml. of Alcoa F–10 alumina. The wet impregnated alumina was dried in an atmosphere of hydrogen fluoride. A vapor phase mixture of $CCl_4$ and HF was passed over the catalyst for 4.5 hours in the reactor of Example 4 heated to 350° C. Reaction data for the last 2.5 hours of the run are recorded in the accompanying table.

K

A solution of 119 grams of $CoCl_2 \cdot 6H_2O$ in 250 ml. of 12 normal hydrofluoric acid was used to impregnate 300 ml. of Alcoa F–10 alumina and the wet alumina so impregnated was dried in an atmosphere of hydrogen fluoride. This catalyst was loaded into the same reactor used in the preceding run and a vapor phase mixture of $CCl_4$ and HF was passed over the catalyst for 7.5 hours at 350° C. Reaction data for the last 90 minutes of this run are listed in the accompanying table.

L

Approximately 250 ml. of Alcoa F–10 alumina were impregnated in a solution of 20 grams of $PdCl_2 \cdot 2H_2O$ in 160 ml. of 0.7 normal hydrochloric acid and the wet alumina so impregnated was dried in an atmosphere of anhydrous hydrogen fluoride. The catalyst so prepared was loaded into the reactor used in the preceding runs and a vapor phase mixture of $CCl_4$ and HF was passed through the catalyst bed for 3.5 hours. The data for the last 90 minutes of the reaction are in the table. The catalyst used in the reaction was found by X-ray diffraction analysis to contain, in addition to gamma alumina, anhydrous $AlF_3$, anhydrous $Al(OH,F)_3$, a compound thought to be another basic aluminum fluoride, and $PdF_2$.

|  | J | K | L |
|---|---|---|---|
| Temperature of reactor _____° C__ | 350 | 350 | 350 |
| Mole ratio of $HF/CCl_4$ _____ | 3.3 | 4.15 | 7.5 |
| Contact time _____seconds__ | 7.5 | 4.4 | 2.9 |
| Product recovery (based on $CCl_4$ charged) mole percent__ | 85.0 | 93.5 | 103.8 |
| $CF_4$ _____do____ | 0.2 | 0.9 | 0.1 |
| $CClF_3$ _____do____ | 61.1 | 71.7 | 76.3 |
| $CCl_2F_2$ _____do____ | 22.2 | 20.9 | 27.4 |
| $CCl_3F$ _____do____ | 0.4 |  |  |
| $CCl_4$ _____do____ | 1.1 |  |  |
| $CO_2$ _____do____ |  |  |  |

We claim:

1. A method of fluorinating haloalkanes which comprises passing a vapor mixture of a haloalkane having from 1 to 2 carbon atoms, including at least one carbon atom attached to a minimum of two halogens of atomic number not greater than 35, at least one of which is of atomic number from 17 through 35 inclusive, and at least an equimolar proportion of hydrogen fluoride at a reaction temperature in the range of 150° to 500° C. through a bed of a catalyst consisting essentially of at least five percent by weight of a basic aluminum fluoride and at least one member of the group consisting of alumina, alumina hydrate, and aluminum fluoride promoted with at least one halide of a metal of the group consisting of chromium, cobalt, nickel, copper, and palladium.

2. A method of fluorinating a haloalkane which comprises passing a vapor mixture of a haloalkane having from 1 to 2 carbon atoms, including at least one carbon atom attached to a minimum of two halogens of atomic number not greater than 35, at least one of which is of atomic number from 17 through 35 inclusive, and at least an equimolar proportion of hydrogen fluoride at a reaction temperature of 150° to 500° C. through a bed of a catalyst consisting essentially of alumina impregnated with from 0.1 to 10 percent by weight (based on the metal) of at least one halide of at least one metal of the group consisting of chromium, cobalt, nickel, copper, and palladium and containing at least 5 percent by weight of a basic aluminum fluoride.

3. A method according to claim 2 wherein the haloalkane is $CBr_4$.

4. A method according to claim 2 wherein the haloalkane is $CCl_4$.

5. A method according to claim 2 wherein the haloalkane is $CHCl_3$.

6. A method according to claim 2 wherein the haloalkane is $CCl_3CH_3$.

7. A method according to calim 2 wherein the haloalkane is $CCl_3CCl_3$.

8. A method of preparing $CBrF_3$ which comprises passing a vapor mixture of HF and $CBr_4$ in a mole ratio of at least 3:1 and at a temperature of 200° to 425° C., through a bed of a catalyst consisting essentially of gamma alumina containing from 0.1 to 10 percent by weight (based on nickel) of a nickel halide and at least 5 percent by weight of a basic aluminum fluoride.

9. A method of preparing $CBr_2F_2$ which comprises passing a vapor mixture of HF and $CBr_4$ in a mole ratio of at least 2:1 and at a temperature of 200° to 425° C. through a bed of catalyst consisting essentially of gamma alumina containing from 0.1 to 10 percent by weight (based on nickel) of a nickel halide and at least 5 percent by weight of a basic aluminum fluoride.

10. A method of preparing $CClF_3$ which comprises passing a vapor mixture of HF and $CCl_4$ in a mole ratio of at least 3:1 and at a temperature of 200° to 425° C. through a bed of catalyst consisting essentially of gamma alumina containing from 0.1 to 10 percent by weight (based on nickel) of a nickel halide and at least 5 percent by weight of a basic aluminum fluoride.

11. A method of preparing $CHF_3$ which comprises passing a vapor mixture of HF and CHCl₃ in a mole ratio of at least 3:1 and at a temperature of 200° to 425° C. through a bed of a catalyst consisting essentially of gamma alumina containing from 0.1 to 10 percent by weight (based on copper) of copper fluoride and at least 5 percent by weight of a basic aluminum fluoride.

12. A method of preparing $CF_3CH_3$ which comprises passing a vapor mixture of HF and $CCl_3CH_3$ in a mole ratio of at least 3:1 and at a temperature of 200° to 425° C. through a bed of a catalyst consisting essentially of gamma alumina containing from 0.1 to 10 percent by weight (based on nickel) of a nickel halide and at least 5 percent by weight of a basic aluminium fluoride.

13. A method of preparing fluorinated perchloroethanes containing a preponderance of at least a trifluorinated perchloroethane which comprises passing a vapor phase mixture of HF and $CCl_3CCl_3$ in a mole ratio of at least 3:1 and at a reaction temperature in the range of 200° to 500° C. through a bed of a catalyst consisting essentially of gamma alumina containing from 0.1 to 10 percent by weight (based on nickel) of a nickel halide and at least 5 percent by weight of a basic aluminum fluoride.

14. A method of fluorinating a haloalkane which comprises passing a vapor mixture of a haloalkane having from 1 to 2 carbon atoms, including at least one carbon atom attached to a minimum of two halogens of atomic number not greater than 35, at least one of which is of atomic number from 17 through 35 inclusive, and at least an equimolar proportion of hydrogen fluoride at a reaction temperature of from about 150° C. to about 500° C. through a bed of a catalyst prepared by the steps which comprise impregnating a porous activated alumina with an aqueous solution of a halide of at least one metal from the group consisting of chromium, cobalt, nickel, copper, and palladium to incorporate the metal halide in an amount of at least 0.1 percent by weight based on the metal of the halide, and thereafter passing a stream of hydrogen fluoride gas into contact with the wet impregnated alumina until it becomes sensibly dry.

15. A method of fluorinating a haloalkane which comprises passing a vapor mixture of a haloalkane having from 1 to 2 carbon atoms, including at least one carbon atom attached to a minimum of two halogens of atomic number not greater than 35, at least one of which is of atomic number from 17 through 35 inclusive, and at least an equimolar proportion of hydrogen fluoride at a reaction temperature of from about 150° C. to about 500° C. through a bed of a catalyst prepared by the steps which comprise impregnating a porous activated alumina consisting preponderantly of gamma alumina with an aqueous solution of a halide of at least one metal from the group consisting of chromium, cobalt, nickel, copper, and palladium, to incorporate the metal halide in an amount of from 0.1 to 10 percent by weight based on the metal of the halide, and thereafter passing a stream of hydrogen fluoride gas into contact with the wet impregnated alumina until it becomes sensibly dry.

References Cited in the file of this patent

UNITED STATES PATENTS

| | | |
|---|---|---|
| 2,381,562 | Stewart | Aug. 7, 1945 |
| 2,458,551 | Benning | Jan. 11, 1949 |
| 2,471,525 | Hillyer et al. | May 31, 1949 |
| 2,478,201 | Miller et al. | Aug. 9, 1949 |
| 2,478,932 | Miller et al. | Aug. 16, 1949 |
| 2,574,480 | Hillyer et al. | Nov. 13, 1951 |
| 2,594,706 | Allan | Apr. 29, 1952 |